Nov. 3, 1936. E. W. WEBB 2,059,503
SPRING FRICTION DEVICE
Filed Sept. 22, 1933    2 Sheets-Sheet 2
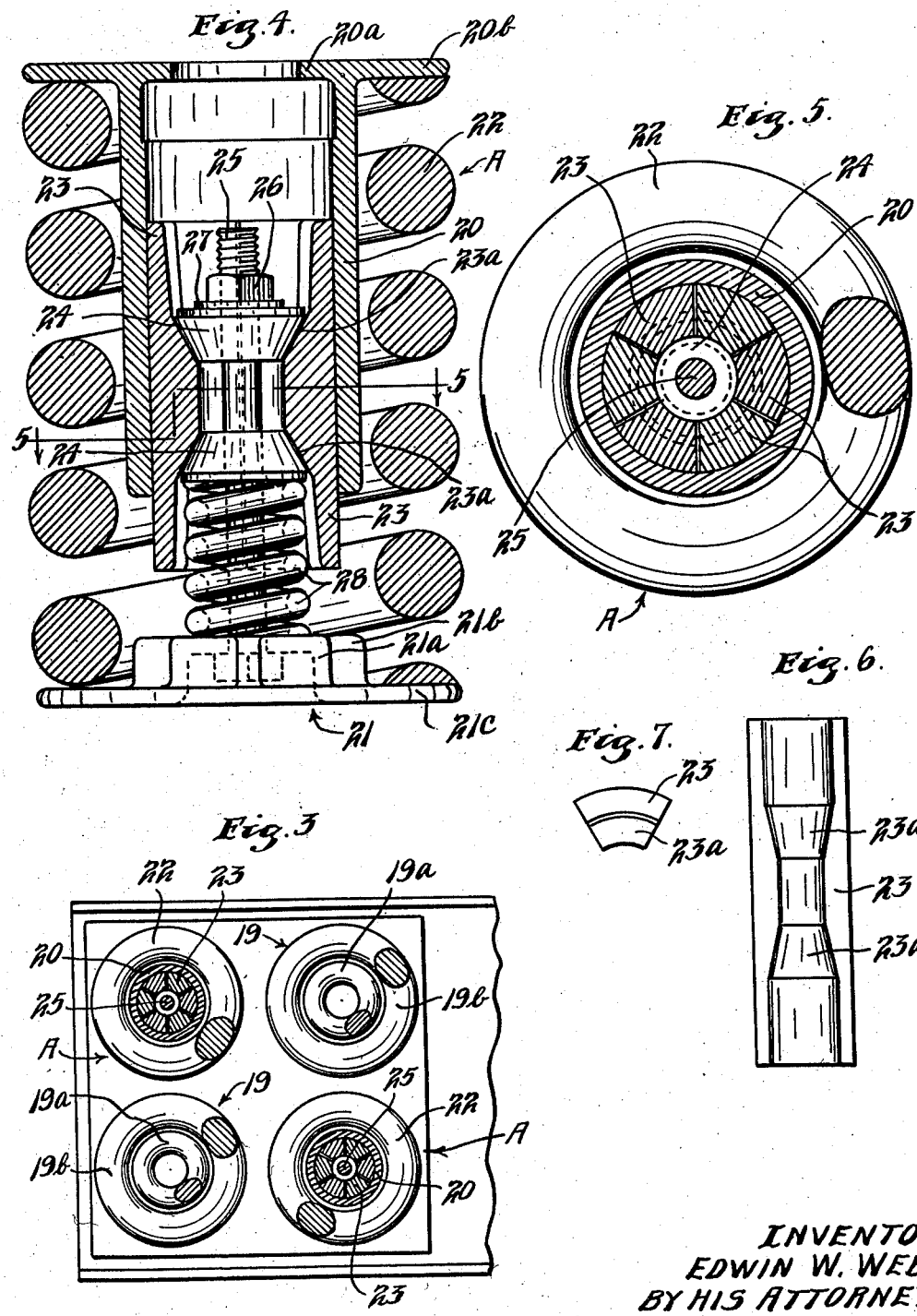
INVENTOR.
EDWIN W. WEBB.
BY HIS ATTORNEYS.

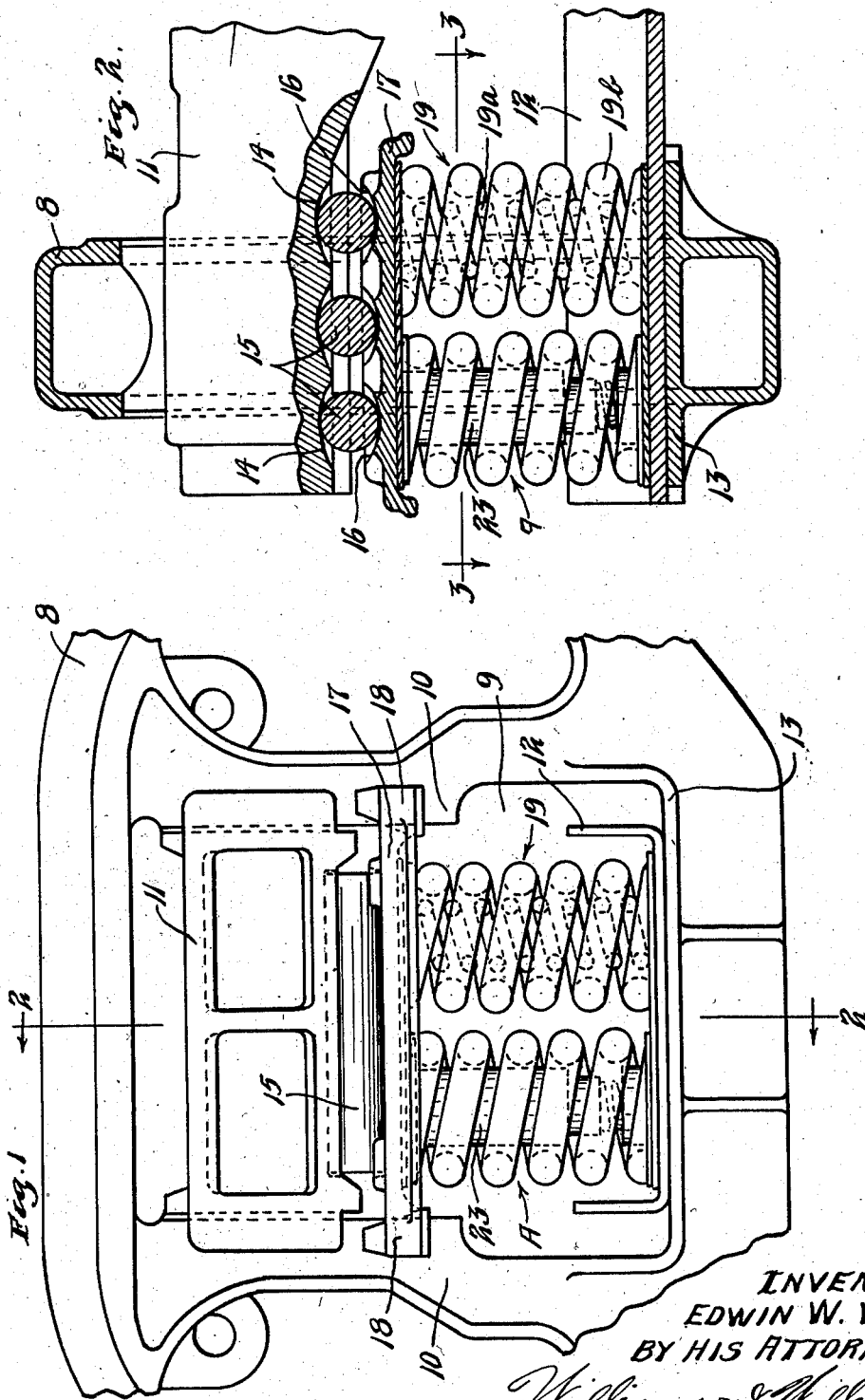

Patented Nov. 3, 1936

2,059,503

UNITED STATES PATENT OFFICE 2,059,503

SPRING FRICTION DEVICE

Edwin W. Webb, Chicago, Ill., assignor to Standard Car Truck Company, Chicago, Ill., a corporation of New Jersey Application September 22, 1933, Serial No. 690,534

3 Claims. (Cl. 267—9)

This invention relates to spring friction devices which are particularly adapted for use on railroad car trucks, although they may be used elsewhere if so desired.

It is the general object of the invention to provide a novel and improved spring friction device which can be used to prevent the natural harmonic action of the spring or springs used in and with the device.

A further object of the invention is to provide a spring friction device for breaking down or interrupting the natural harmonic action of springs through frictional checks on the action of the springs and to provide in such a device means for readily adjusting the frictional resistance offered to the action of the springs.

Another object is to provide an exceedingly simple and inexpensive spring friction device, the major part of which may be used as a replacement for the inner spring of a standard type, compound coiled spring used on car trucks.

The objects and advantages of the invention will more fully appear from the following description made in connection with the accompanying drawings, wherein like reference characters refer to the same or similar parts throughout the various views, and in which:—

Fig. 1 is a view in side elevation illustrating portions of a car truck wherein spring friction devices embodying the invention are utilized;

Fig. 2 is a vertical section taken on the line 2—2 of Fig. 1 as indicated by the arrows;

Fig. 3 is a horizontal section taken on the line 3—3 of Fig. 2 as indicated by the arrows, the side frame not being shown;

Fig. 4 is a vertical section taken through one of the spring friction devices of the invention;

Fig. 5 is a horizontal section taken on the line 5—5 of Fig. 4, as indicated by the arrows;

Fig. 6 is a view looking toward the inner side of one of the friction shoes used in the spring friction devices; and Fig. 7 is a plan view of the same friction shoe.

Referring to the drawings, there are shown in Figs. 1, 2, and 3, certain portions of a car truck including the side frame 8, having a lateral opening 9 extending between the compression and tension members of the side frame, the sides of this opening being formed by columns 10. One end of a bolster 11 works within the opening 9 while one end of a spring plank 12 rests upon a spring plank seat 13 formed by that portion of the tension member of the side frame between the columns 10. Of course, the bolster 11 and spring plank 12 extend across to the opposite side frame. The ends of the bolster 11 are provided with roller bearing seats 14 receiving roller bearings 15 supported within roller bearing seats 16 formed in roller bearing plates 17. Each roller bearing plate has jaws 18 which embrace the sides of the columns 10 to prevent lateral movement of the roller bearing plate 17 relative to the side frame. Supporting the roller bearing plate 17 from the spring plank 12 are two compound springs 19 of standard construction and including inner and outer coiled compression springs 19a and 19b. Also supporting the roller bearing plate 17 from the spring plank 12 are two spring friction devices A of the present invention.

Preferably, the compound springs 19 and spring friction devices A are set relative to each other at the corners of a square with the two compound springs 19 being set diagonally relative to each other and the two spring friction devices A being set diagonally relative to each other.

Each spring friction device A includes a cylindrical thimble 20 open at one end and having an inturned flange 20a and an outturned flange 20b at its other end. Disposed in spaced relation from the open end of the thimble 20 is a head 21 having an upstanding cup-like portion 21a provided with a number of radial lugs 21b forming spring centering devices. A portion of the head 21 joining the cup-like portion 21a forms a flange 21c which is directly opposed from the flange 20b of the thimble. A heavy coiled compression spring 22 surrounds the major portion of the thimble 20 and reacts between the thimble and the head 21, one end of the spring bearing against the flange 20b and the other end of the spring bearing against the flange 21c.

Fitting within the thimble 20 are a plurality of friction shoes 23 having arcuate outer surfaces which engage the inner walls of the thimble. These friction shoes are assembled together to form a many-part cylindrical shell which engages the inner walls of the thimble. In the illustrated embodiment six friction shoes are shown, although it will be understood that any desired number of these shoes may be used.

The friction shoes 23 each have upper and lower inwardly projecting conical wedging surfaces 23a and these surfaces are engaged respectively by the conical surfaces of truncated conical upper and lower wedges 24. The upper wedge surfaces 23a of the friction shoes project downwardly and inwardly, while the lower wedging surfaces 23a project upwardly and inwardly.

The two wedges 24 oppose each other and are apertured to receive a bolt 25 which projects downwardly through the wedges and loosely through a central opening in the cup-shaped portion 21a of the head 21. The head of the bolt 25 bears against the cup-shaped portion 21a of the head 21 and a nut 26 engages the upper screw threaded end of the bolt above the upper wedge 24 and this nut bears against a washer 27 disposed against the upper surface of the upper wedge 24.

Surrounding the bolt 25 between the lower wedge 24 and the cup-shaped portion 21a of head 21 is a coiled compression spring 28, the individual turns of which are closely spaced from each other. The nut 26 is so adjusted on the bolt 25 that the spring 28 is constantly maintained under compression and this spring is capable of but slight further compressive movement until the different turns of the spring engage each other so that the spring becomes solid.

When the spring friction devices A are located as shown in Figs. 1, 2, and 3 in a car truck between the spring plate 12 and the roller bearing plate 17, and used in combination with standard compound springs 19, these spring friction devices act not only to dampen the action of the springs 22 of the spring friction devices to prevent natural harmonic action of these springs, but they also act to dampen the natural harmonic action of the compound springs 19. As the spring friction devices A and the springs 19 are placed under additional compression, each head 21 moves towards its thimble 20 tending to cause the many part shell formed by the friction shoes 23 to slide relative to the thimble 20. Pressure applied by spring 28 tending to urge the wedges 24 toward each other, urges the friction shoe 23 radially outwardly from the longitudinal axial center line of the thimble 20 and longitudinal sliding movement of the shell formed by the friction shoes is resisted by their frictional engagement with the inner wall of the thimble 20. During initial movement of the head 21 towards the thimble 20, the spring 28 may be compressed somewhat further than normally before the shell formed by the friction shoes 23 slides relative to the thimble 20. However, the lower wedge 24 against which spring 28 bears will then tend to exert more pressure against the shoes 23 than does the upper wedge 24 and the shell will quickly begin to slide relative to the thimble 20. As the shell slides a condition of moving friction rather than static friction will exist and, the spring 28 will expand toward its original position to cause the pressures exerted by the upper and lower wedges 24 against the shoes 23 to approach equality. The spring 28 thus causes the shoes 23 to offer slight resistance to the compressive action of the spring friction device A at all times. This resistance or drag on the compressive movement of the spring friction device interferes with and breaks up the natural harmonic action of the spring 22 and as the compound springs 19 can only compress as the springs 22 of the spring friction devices compress, the natural harmonic action of these springs 19 will similarly be broken up. After the spring friction devices have been compressed, the springs 28 and wedges 24 acting against the friction shoes 23 still cause the shell formed by these shoes to offer resistance to sliding movement and as the head 21 moves away from the thimble 20 due to the expansion action of the spring friction devices, the friction shoes offer their resistance to this movement so as to prevent the springs 22 and the springs 19 from rebounding in their natural periodic time, thereby causing the rebound action of the springs to be dampened. Also as the springs 22 and 19 have been slowed down in their compressive action due to the frictional resistance offered by the shoes 23, the natural rebound action of these springs is further dampened. By reason of these facts, much greater stability and easier riding qualities are given to a car having car trucks equipped with the spring friction devices of the invention.

It is not necessary that there be great frictional resistance to the relative sliding movement between the shell formed by the friction shoes 23 and the thimble 20, in order to effectively dampen the harmonic action of the springs 22 and 19. By adjusting the nut 26 upwardly and downwardly on the bolt 25, the tension exerted by the spring 28 may be adjusted, so as to easily and effectively adjust the frictional resistance offered to the compressive and expansion action of the spring friction device through engagement of the outer surfaces of the friction shoes 23 with the inner wall of the thimble 20.

In my present spring friction device the spring 28 is not designed to assist materially in cushioning the compressive forces tending to compress the spring 22, as was the case in my prior invention above referred to. By reason of the fact that the shell formed by the friction shoes 23 and the thimble 20 are supported from the head 21 entirely by means of the springs 22 and 28 and the head 21 is not guided in its movement to and from the thimble, the head 21 may twist and weave relative to the shell and to the thimble, without interfering with the proper contact between the friction shoe 23 and the thimble 20. The bolt opening in the head 21 is quite large so that the head 21 may readily tilt or turn relative to the bolt without difficulty.

The spring friction device of the invention is of exceedingly simple and inexpensive construction and is effective in use for breaking down the periodic action of the springs used in the device and with the device. The spring 22 is of very similar construction to the spring 19b of standard compound spring 19 and that portion of the device formed by the parts 20, 21, 23, 24, 25, 26, 27, and 28 serve as a replacement for the inner spring 19a of a compound spring 19.

It will, of course, be understood that various changes may be made in the form, details, arrangement and proportions of the various parts without departing from the scope of the present invention, which generally stated, consists in a device capable of carrying out the objects above set forth and in the novel parts and combinations of parts disclosed and defined in the appended claims.

The present invention is in part a continuation of my prior application entitled "Spring friction device", S. N. 667,159, filed April 21, 1933.

What is claimed is:—

1. A spring friction device having in combination, a thimble open at one end, a head spaced outwardly from the open end of said thimble, a plurality of friction shoes having outer surfaces shaped to engage portions of the inner walls of said thimble, said friction shoes being assembled together within said thimble to form a many part shell bearing against the inner walls of said thimble, said shoes having upper and lower inwardly projecting wedging surfaces, upper and lower oppositely disposed wedges bearing against said respective wedging surfaces, a spring disposed between said lower wedge and said head, a spring encircling the major part of said thimble and reacting between said head and said thimble, and a longitudinally adjustable member projecting loosely through said head and extending through said upper and lower wedges, said member bearing at one end against said head and at its other end against said upper wedge.

2. A spring friction device having in combination, a thimble open at one end, a head spaced outwardly from the open end of said thimble, a plurality of friction shoes having outer surfaces shaped to engage portions of the inner walls of said thimble, said friction shoes being assembled together within said thimble to form a many part shell bearing against the inner walls of said thimble, said shoes having upper and lower inwardly projecting wedging surfaces, upper and lower oppositely disposed wedges bearing against said respective wedging surfaces, a spring interposed between said shell and said head, a bolt passing loosely through said head and projecting through said two wedges, said bolt having a nut screwed thereon and bearing against said upper wedge and a coiled spring interposed between said lower wedge and said head and surrounding said bolt.

3. A spring friction device having in combination a cylinder open at one end, a plurality of friction shoes having outer surfaces shaped to engage portions of the inner walls of said cylinder, said friction shoes being assembled together within said cylinder to form a many part cylindrical shell bearing against the inner walls of said cylinder, said shoes having upper and lower inwardly projecting wedging surfaces formed in a circular manner, an upper wedge bearing against said upper wedging surfaces, a lower wedge bearing against said lower wedging surfaces, a head spaced outwardly from the open end of said cylinder at a substantial distance away from said cylinder, a helical spring disposed between said lower wedge and said head and supporting said wedge and said cylinder resiliently from said head in such a manner as will permit swinging and revolving movement of said head relative to said cylinder and a tie rod member extending between said upper wedge and said head and having bearing against the upper part of said upper wedge and the lower part of said head.

EDWIN W. WEBB.